Figure 2:
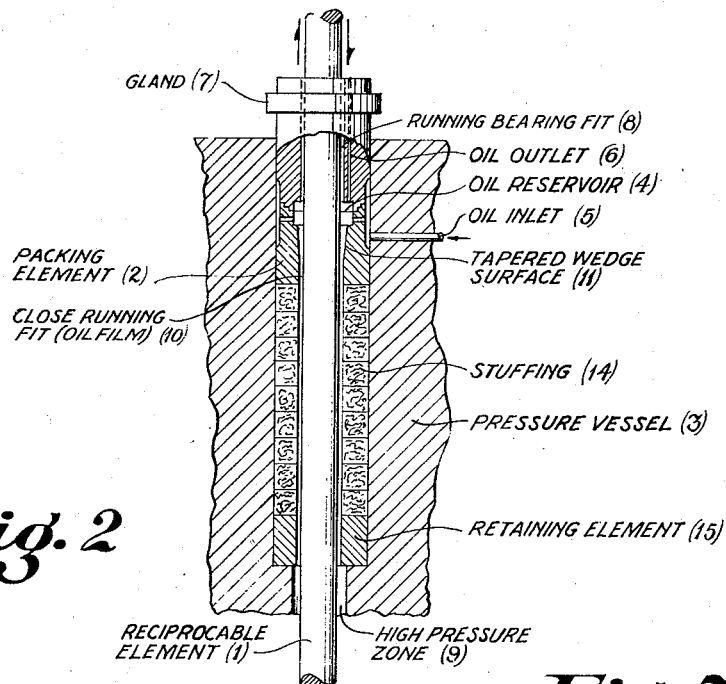
Figure 1:
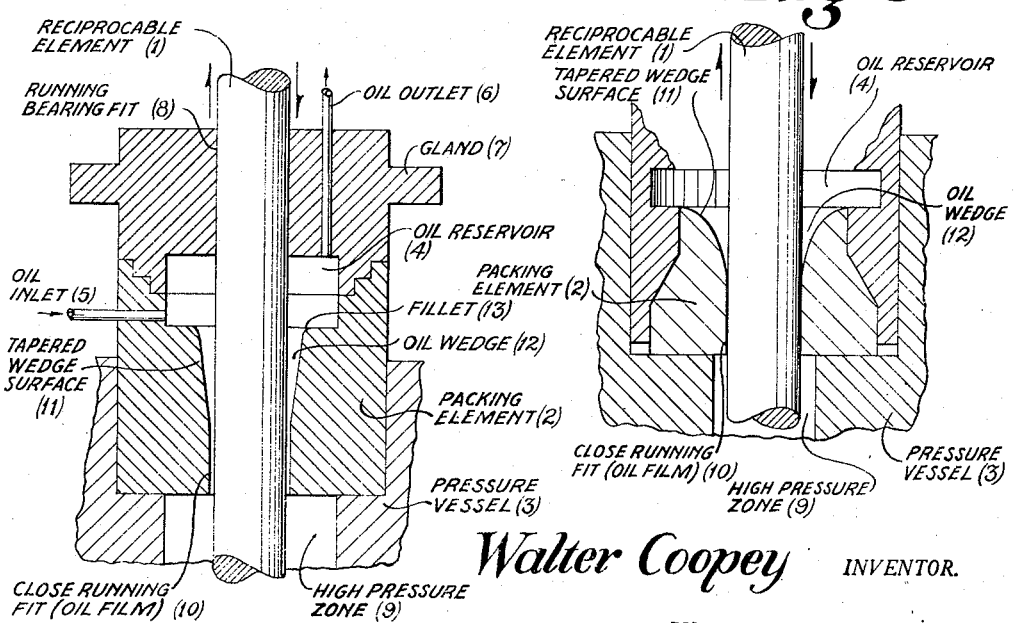
Figure 3:
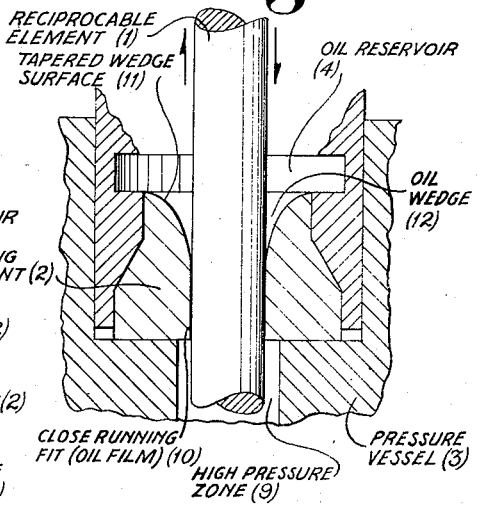

Feb. 20, 1945. W. COOPEY 2,369,883
MEANS FOR PACKING RECIPROCABLE ELEMENTS
Filed March 24, 1943

Walter Coopey INVENTOR.
BY Robert H. Kirkwood
ATTORNEY

Patented Feb. 20, 1945

2,369,883

UNITED STATES PATENT OFFICE 2,369,883

MEANS FOR PACKING RECIPROCABLE ELEMENTS

Walter Coopey, Charleston, W. Va., assignor to E. I. du Pont de Nemours & Company, Wilmington, Del., a corporation of Delaware Application March 24, 1943, Serial No. 480,313

3 Claims. (Cl. 286—26)

This invention relates to a method and means for sealing a reciprocable element, and more particularly to packing means therefor adapted to withstand high pressure.

One of the most urgent problems of the industries utilizing high pressures is the problem of forming a pressure-tight joint between the contents of pressure vessels and the atmosphere when a moving element, such as a piston, stirring rod and the like, must be in communication with the atmosphere. Conventionally, the reciprocable or other moving element is surrounded with two or more retaining rings and with many rings or layers of packing elements, usually of asbestos, tow, oakum and the like, which are compressed and held in place by a packing gland. For relatively low pressures of the order of a few hundred lbs. per sq. in. such a packing device functions with a fair degree of satisfaction, but for high pressures of the order of 5,000 to 15,000 lbs. per sq. in. and higher such packing rapidly breaks down and fails to provide a pressure tight seal. Where the service is corrosive, as in the chemical industries, the ordinary packing breaks down even more rapidly and is entirely unsuitable. Thus, it has become axiomatic in the high pressure industry to avoid wherever possible the use of moving connections between high and low pressure zones.

Accordingly, it is an object of this invention to provide a pressure-tight seal between a reciprocable element and a pressure-retaining wall. Another object is to provide a novel high pressure packing device. Yet another object is to provide a pressure-tight seal between a reciprocable element apertured in a pressure vessel and the vessel itself. A further object is to provide a novel packing element which owes its sealing effect to a lubricant film.

These and other objects hereinafter apparent are accomplished by this invention, the particular features and advantages of which will be made clear by reference to the accompanying drawing and ensuing description.

In accordance with this invention, the disadvantages of prior devices are overcome, and a pressure-tight seal is formed between a reciprocable element mounted in the packing element positioned between a high pressure zone and a low pressure zone by forming a lubricant wedge surrounding the reciprocable element in the low pressure zone, and developing therefrom a sealing lubricant film in the free space adjacent the high pressure zone between the reciprocable element and the packing element.

It has been discovered that a film of lubricant alone is sufficient to seal a reciprocable element mounted in a pressure wall provided that the film of lubricant is properly developed and replenished. It has also been discovered that, by feeding the lubricant to a packing ring or other means closely engaging the reciprocable element and mounted in the pressure vessel as hereinafter explained, a pressure seal capable of withstanding pressures of the order of 10,000 to 15,000 lbs. per sq. in. and higher is formed. However, the lubricant must be fed from the low pressure zone by the reciprocable element to the "running fit" of the packing element by means of a generally annular passageway having a wedged-shaped cross section when the wedge is bounded by the reciprocable element itself and an enlarged space in the packing element.

Referring now to the drawing,

Figure I represents a sectional view of a reciprocable element mounted in a packing element designed according to the present invention, which in turn is mounted in the wall of a pressure vessel.

Figure II represents a sectional view of a reciprocable element mounted within a packing element in accordance with the present invention, which in turn is mounted in the wall of the pressure vessel, the reciprocable element being provided with a quantity of stuffing material held in place by a retaining element on the high pressure side.

Figure III represents in section a modification wherein the reciprocable element is mounted within the packing element which in turn is mounted in the pressure vessel, the wedged surface in Figure III having a tapered portion in the form of a curve rather than a flat wedge.

In the construction of a high pressure packing in accordance with this invention, and referring now to Figure I of the drawing, the reciprocable element 1 is mounted in the packing element 2 further to be described, which in turn is mounted in the pressure vessel wall 3. The packing element 2 is provided with an oil reservoir 4 on the low pressure side of the packing element 2. The oil reservoir 4 has an oil inlet 5 and an oil outlet 6 supplied with lubricant under positive feed pressure from a device not shown. The oil reservoir 4 is enclosed on the low pressure side by the gland 7 which in turn is removably attached to the pressure vessel 3 by means not shown. The gland 7 can be in one piece with the packing element 2 but as illustrated is shown detachable therefrom for ease in construction. The gland 7 surrounds the reciprocable element 1 in a running bearing fit 8 which serves to retain the oil in the oil reservoir 4 and also may serve as a bearing for the reciprocable element 1. The packing element 2 is seated in the pressure vessel 3 and serves to maintain a pressure seal in the high pressure zone 9 by virtue of the oil film developed in the close running fit 10 communicating on the low pressure side with the tapered wedge surface 11 which in turn cooperates with the reciprocable element 1 to form an oil wedge 12. The tapered wedged surface 11 is desirably tapered at an angle of from about 1° to 4° measured from the axis of the reciprocable element 1, and preferably is tapered at an angle of about 2° to 3°. The angle of the taper depends upon the viscosity of the lubricant employed, and can be varied somewhat from the ranges indicated. The tapered wedged surface 11 of the packing element 2 communicates with the oil reservoir 4 through the filleted surface 13. The filleted surface 13 is not essential, but aids in the development of the lubricant wedge. In operation, the reciprocable element moves along its longitudinal axis and the oil reservoir 4 is supplied with a lubricant adapted for the service conditions. The reciprocable element 1 cooperates with the tapered wedged surface 11 of the packing element 2 to form a lubricant wedge 12 which supplies a sealing lubricant film to the close running fit 10. When the close running fit 10 is supplied through the wedged surface 11, the oil film is developed continuously in the close running fit 10 and readily retains a pressure in the high pressure zone 9 of the order of 10 to 15,000 lbs. per sq. in. When the packing element 2 has only the close running fitted surface 10 without the tapered wedge surface 11, the oil film in the close running surface quickly breaks down or is never developed and cannot hold any substantial pressure.

The device illustrated in Figure II is similar in principle and operation to the device of Figure I, being modified so as to prevent wear on and corrosion of the packing element 2 and also to prevent oil contamination of the contents of the high pressure zone 9. Briefly stated, the device of Figure II comprises a reciprocable element 1, mounted in a packing element 2 which in turn is mounted in a pressure vessel wall 3. The packing element 2 is provided with a close running fitted portion 10 and a tapered wedged surface 11 communicating with the oil reservoir 4. Oil or other lubricant under atmospheric or moderate pressure is supplied to the oil reservoir 4 through the oil inlet 5 and excess oil escapes from the reservoir 4 through the running bearing 8 of the gland 7. The gland 7 and packing element 2 are retained in the pressure vessel 3 by means not shown. Toward the high pressure zone 9, and below the packing element 2, is a body of stuffing 14 held in place by a retaining element 15 which in turn is seated in the pressure vessel 3. The stuffing 14 is any of the known stuffing and plastic packing materials such as rings of compressed tow, oakum, graphited asbestos and the like. The stuffing 14 measured along the axis of the reciprocable element 1 may be of any length suitable for the intended service, but for corrosive conditions it is preferably of such a length that the stroke or travel of the reciprocable element 1 does not bring any adhering contents of the high pressure zone 9 up to the close running fit 10 of the packing element 2. Thus, the stuffing 14 serves to prevent lubricant leakage from the close running fit 10 reaching the high pressure zone 9. Also, the contents of the high pressure zone 9 cannot come in contact with the close running fit 10 although the pressure in the high pressure zone is held by the packing element 2 and no substantial pressure is held by the stuffing 14. The retaining element 15 preferably in the form of an annular ring, serves the dual function of retaining the stuffing 14 in position, and also of providing a bearing surface for the reciprocable element 1. Thus, wear and corrosion are prevented in the close running fit 10 which in cooperation with the tapered wedge surface 11 and the reciprocable element 1 serves to retain the pressure in the high pressure zone 9. The gland 7 can, if desired, be provided with a running bearing fit 8 as in the preceding example. The reciprocable element is provided with means for moving it along its longitudinal axis, such means not being illustrated. In the packing element 2, the tapered wedge surface 11 cooperating with the close running fit 10 is supplied with lubricant from the oil reservoir 4 and the sealing lubricant film in the close running fit 10 is developed and maintained by "wedge-action" in the annular space between the tapered wedge surface 11 and the reciprocable element 1. In the absence of the tapered wedge surface 11, as for instance if the close running fit 10 directly abutted the oil reservoir 4, no substantial pressure is retained by the packing element. On the other hand, in operation of the device as illustrated, pressures of the order of 10,000 to 15,000 lbs. per sq. in. and higher are readily retained.

Figure III shows an enlarged sectional view of one form of the present invention wherein the tapered wedged surface 11 is not provided with a uniform taper but is provided with a taper in progressively increasing degree; that is, viewed in cross section, the oil wedge 12 has one straight surface against the reciprocable element 1 and one curved surface against the tapered wedged surface 11. Desirably, the tapered wedge surface 11 has a large opening in the oil reservoir 4 and progressively decreases in size to the close running fit 10 where the sealing oil film is developed by virtue of "wedge-action." The oil wedge 12 co-operates with the reciprocable element 1 and the packing element 2 to provide an oil seal capable of retaining pressures in the high pressure zone 9 of the order of 10,000 to 15,000 lbs. per sq. in. As illustrated in Figure III, the tapered wedge surface 11 is in the form generated by one quadrant of an elipse, and in the portion adjacent the close running fit 10 the angle approaching the tangential portion is from about 1° to about 4°, and preferably from about 2 to 3° as measured in cross section from the axis of the reciprocable element 1. In operation, the reciprocable element 1 cooperates with the packing element 2 to develop along the tapered wedge surface 11 an oil film in the close running fit 10.

The packing element 2 may be formed of any desired material of construction, such as bronze, copper, silver and alloys thereof with cadmium, copper and the like, steel, stainless steel, and the like. The drawing illustrates the packing arrangement of the present invention in section, but it is to be understood that they may be of any desired dimensional shapes provided only that a close running fit and a wedged surface as described are in cooperative engagement with the reciprocable element. The reciprocable element for convenience of manufacture is generally in a cylindrical form, such as a shaft, piston, or other shape, but may be of a square or elongated cross section. Likewise, the packing element and gland may be of any desired exterior shape, but are usually for convenience of manufacture in annular or cylindrical form. When the reciprocable element is in the form of a cylinder, it may also be given a rotary motion such as would be advantageous in stirring a high pressure autoclave but should have sufficient reciprocating motion to form and develop in the oil wedge a sealing oil film for the close running fit 10.

While only a single packing element has been illustrated and described, it is obvious that several packing elements may be mounted along a reciprocable shaft, piston and the like in order to share their proportionate amounts of the high pressure load in the high pressure zone, thus permitting a pressure-tight seal for any pressure for which equipment could be designed.

It is desirable that the oil reservoir feeding the oil wedge be under a sufficiently high positive pressure to insure the feeding of oil or other lubricant to the oil wedge, but for ordinary purposes, and where the reciprocable element is mounted vertically, a gravity feed is sufficient. Any of the ordinary positive pressure lubricators can be utilized to supply oil to the oil reservoir, but the oil or other lubricant should not be under a higher pressure than the minimum encountered in the high-pressure zone, in order to avoid contamination.

Although the invention has been described with reference to the use of oil as the lubricant, it is not restricted thereto, since any liquid of sufficient viscosity to form a sealing film in the close-running fit can be employed, for example greases, water, vegetable and animal fats and oils, and in some cases, harmless diluents for the contents of the pressure vessel.

It will be apparent from the foregoing that there has been provided a simple and effective device for sealing reciprocable elements against high pressure.

Since many apparently widely differing embodiments will occur to one skilled in the art it is obvious that various changes and modifications may be made in the detailed construction and practice of the present invention without departing from the spirit and scope thereof.

What is claimed is:

1. A packing device for sealing a reciprocable element mounted in a pressure vessel which comprises the combination with the reciprocable element of a lubricant reservoir surrounding the reciprocable element and a relatively rigid packing element surrounding the reciprocable element, the packing element being adapted to closely engage the reciprocable element for a portion of its length but having an interposed sealing film of lubricant therebetween, while having an annular passageway of progressively diminishing cross-section tapering to the reciprocable element at an angle of 1° to 4°, surrounding the reciprocable element and connecting the lubricant reservoir with the closely engaging portion of the packing element, the said passageway being adapted to develop, between the reciprocable element and the packing element, the said sealing film, capable of retaining within the pressure vessel pressures of the order of 10,000 to 15,000 pounds per square inch.

2. A packing element for pressure-sealing a reciprocable element mounted therein characterized by being adapted to closely engage the said reciprocable element in a close-running fit adjacent to the high-pressure zone, and possessing a tapered bore decreasing in size from the low-pressure zone to the close-running fit, whereby lubricant supplied to the low pressure side of the packing element assumes a generally wedge-shaped cross-section merging into a sealing film which is capable of withstanding a pressure of the order of 10,000 to 15,000 pounds per square inch exerted on the film from the high pressure zone, the said tapered bore section of the said packing element having a taper of from about 2° to 3° measured as an angle from the axis of the reciprocable element.

3. An arrangement for pressure-sealing a reciprocable element mounted in a pressure vessel which comprises in combination a reciprocable element positioned in an aperture in a pressure vessel, and at least one pressure-sealing device having a lubricant reservoir surrounding the said reciprocable element adjacent to the low pressure side and adapted to lubricate the same, the said pressure-sealing device having also a packing element communicating with the lubricant reservoir and surrounding the reciprocable element on the high pressure side, the said packing element being cooperatively engaged by the reciprocable element in a close-running fit through a portion of its length and having throughout the remainder of its length a passageway tapering to the reciprocable element at a taper of from about 1° to 4° measured as an angle from the axis of the reciprocable element, the said passageway surrounding the reciprocable element and connecting the close-running fit with the lubricant reservoir, thus forming with the reciprocable element an annular body of lubricant of generally wedge-shaped cross-section, whereby a pressure-sealing lubricant film is developed in the close-running fit through the cooperative action of the reciprocable element, the said pressure-sealing lubricant film being capable of retaining within the pressure vessel pressures of the order of 10,000 to 15,000 pounds per square inch.

WALTER COOPEY.